United States Patent [19]

Bartlow

[11] Patent Number: 5,375,938
[45] Date of Patent: Dec. 27, 1994

[54] INTERIOR SLEEVE FOR TUBULAR MEMBERS

[75] Inventor: Greg P. Bartlow, Castro Valley, Calif.

[73] Assignee: Steccone Products Co., Oakland, Calif.

[21] Appl. No.: 93,262

[22] Filed: Jul. 15, 1993

[51] Int. Cl.⁵ .............................................. B25G 1/04
[52] U.S. Cl. .................................... 403/202; 403/11; 403/14; 15/144.4
[58] Field of Search ...................... 403/11, 13, 14, 202, 403/288; 15/144.4

[56] References Cited

U.S. PATENT DOCUMENTS

| | | | |
|---|---|---|---|
| 2,898,619 | 8/1959 | Beck | 15/144.4 |
| 2,980,357 | 4/1961 | Labrie | 403/13 |
| 2,984,852 | 5/1961 | George | 15/144.4 |
| 3,407,424 | 10/1968 | Lanzarone et al. | 15/144.4 |
| 4,247,216 | 1/1981 | Pansini | 15/144.4 |
| 4,419,025 | 12/1983 | Takahashi | 403/14 |
| 4,793,646 | 12/1988 | Michaud, Jr. | 15/144.4 |
| 5,020,182 | 6/1991 | Engel | |
| 5,220,707 | 6/1993 | Newman, Sr. et al. | 15/144.4 |
| 5,228,202 | 7/1993 | Liao | 15/144.4 |

Primary Examiner—Edward K. Look
Assistant Examiner—Michael S. Lee
Attorney, Agent, or Firm—Kathleen A. Skinner

[57] ABSTRACT

An interior sleeve for a pair of telescoping tubular members, in which the sleeve is mounted in an outer tubular member. The sleeve has locking studs on its exterior surface which are aligned with locking apertures in the outer tubular member. The sleeve has an annular flange disposed on the outer end of the sleeve to abut to the outer end of the outer tubular member and a longitudinal slot to allow compression of the sleeve to fit into the tubular member.

10 Claims, 3 Drawing Sheets

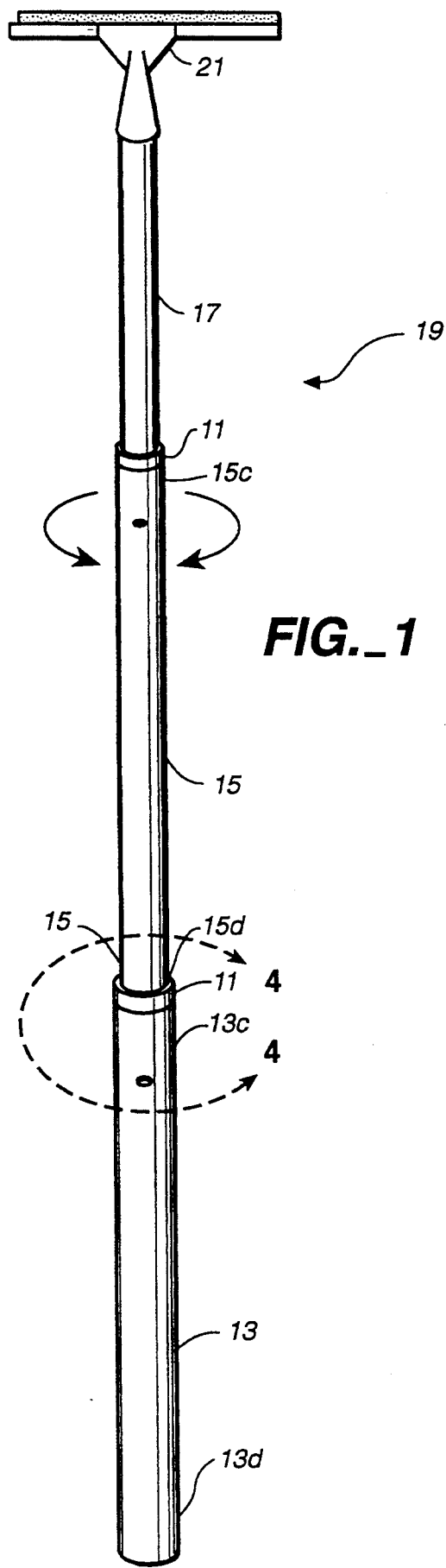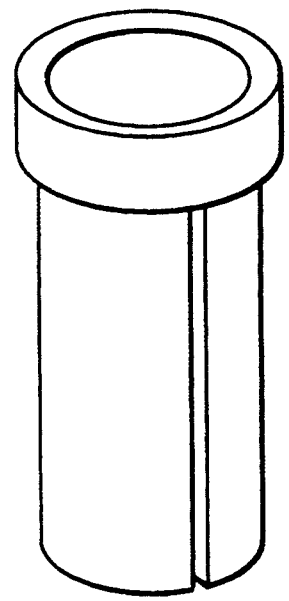
FIG._1
FIG._2
(PRIOR ART)

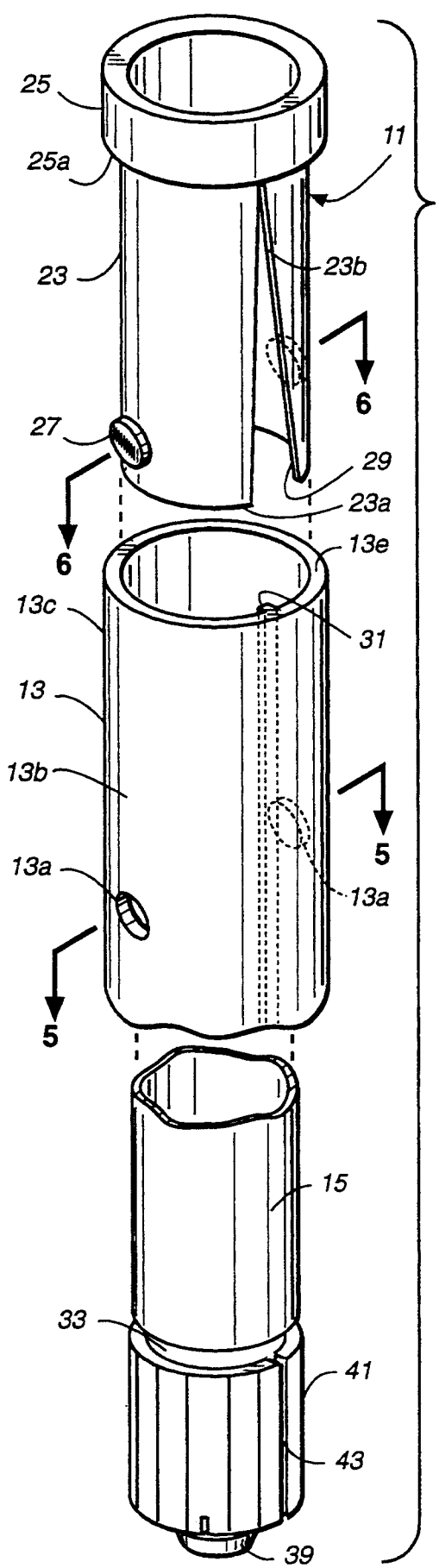
FIG._3
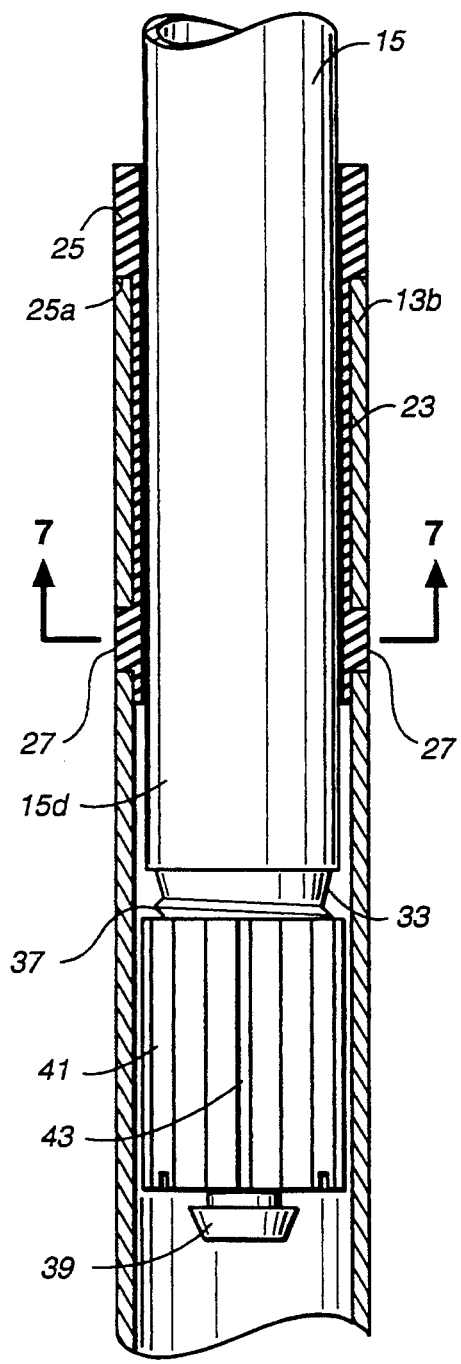
FIG._4

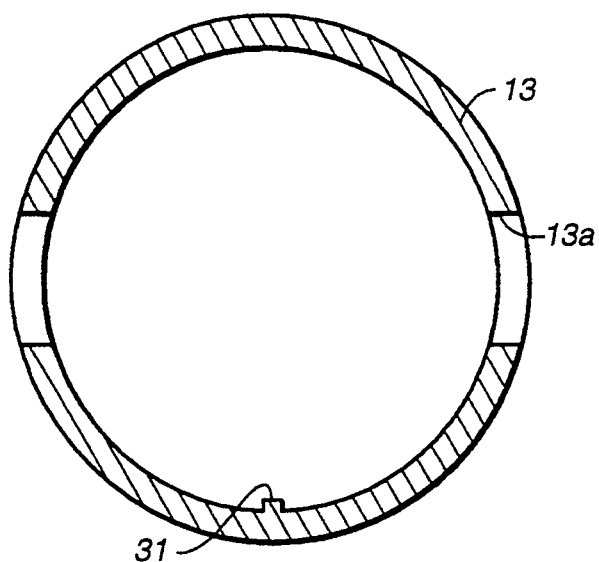
FIG._5
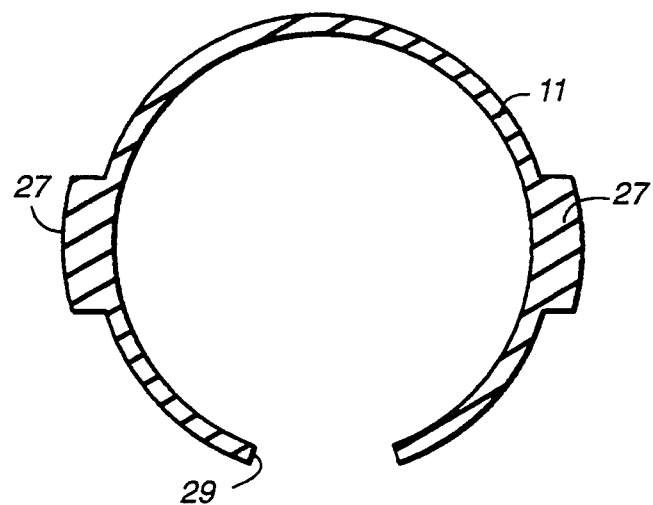
FIG._6
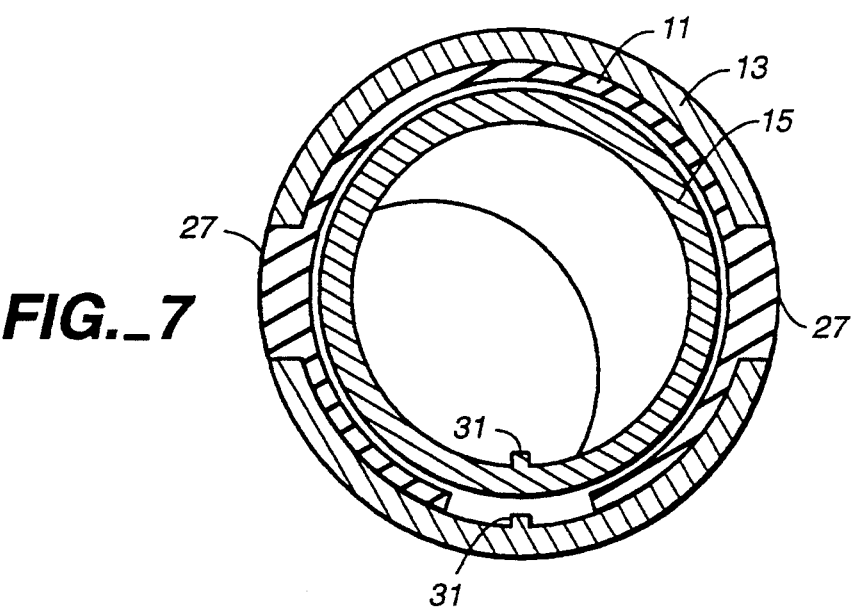
FIG._7

INTERIOR SLEEVE FOR TUBULAR MEMBERS

BACKGROUND OF THE INVENTION

1. Field of the Invention

The present invention relates to the field of telescoping tubular members, such as extension poles and the like, and more particularly to an interior sleeve which locks in place and provides wear resistance between outer and inner tubular members.

2. Background of the Invention

Telescoping tubular members are in use in a number of applications; for example, in cleaning windows, extension poles are used to extend the reach of a squeegee or other tool by the window washer. Extension poles are a series of concentric tubes of increasing diameter stored within each other so that as additional length is needed, a tube with a smaller diameter is pulled out, extended to the desired length, and locked in place. The tool is attached to the end of the unit with the smallest diameter.

There are various means for locking extension poles together when in use, some of them are exterior locking devices and others have interior locking mechanisms, such as that shown in U.S. Pat. Nos. 4,856,929 or 4,238,164, for example. Extension poles with an interior clamping device can provide a smooth unobstructed exterior surface which is preferred by many window washers as the poles are pulled through the user's hands.

Although the adjacent poles of the extension poles are very close in diameter, some spacing is necessary between the inner wall of an outer tube and the outer wall of the next smaller inner tube, to allow for assembly and for ease in sliding the poles during use. Because of this spacing the tubes will bang against each other when subjected to vigorous use, eventually causing wear on the individual extension units and on the rest of the pole, including the locking mechanism. Accordingly, a sleeve such as that shown in FIG. 2 was developed to fit between two telescoping poles and operate as a bushing to facilitate their slidability relative to each other and to provide wear resistance. This prior art sleeve is made of an Acetal plastic, such as Delrin ® plastic from DuPont, for a smooth sliding surface. It has a narrow longitudinal slot to accommodate an internal ridge in the tubular member. It is inserted into the larger of two tubular members and secured by adhesive to the inner surface of that pole. This assembly procedure is very inefficient and frustrating since the slippery surface is required for ease in slidability of the poles, but such a surface is unreceptive for most adhesives. With this prior art sleeve, adhesive is applied to the sleeve before it is inserted in the pole and the pole must then be left undisturbed for some time to dry. After extensive use by window washers under conditions where the pole is exposed to water and cleaning solutions, the adhesion would frequently fail and the sleeve would slip out. Without the sleeve to act as a stop at one end of the pole, the inner pole could be over-extended and pulled out entirely from the outer pole.

Thus, there has been a need, particularly for extension poles for window washers, for a bushing or sleeve to reduce the wear of the telescoping poles on each other and to increase the fit of different-sized poles. This sleeve must be smooth for easy slidability of the poles, yet securely attached to the poles. The present invention provides such a sleeve. It can be made out of any smooth plastic or slippery material desired, since it is secured to the poles by a snap-in action and requires no adhesive. It provides for a better fit of the poles with each other, which reduces the friction and wear on the poles and also increases the precision of the tool mounted on the extension pole. In a typical extension pole, it also provides a permanent stop for the locking mechanism and prevents the inner pole from being entirely removed from the outer pole. Thus, the invention provides a unique solution to the problems of the prior art.

SUMMARY OF THE INVENTION

The present invention is an interior sleeve for an outer tubular member which has a telescoping relation with an inner cylindrical body. The outer tubular member has at least one, and preferably two, locking apertures in its side wall near one end. The sleeve, which is hollow and allows passage of the inner cylindrical body, has at least one, and preferably two, locking stubs which are adapted to fit into the locking apertures of the outer tubular member when the interior sleeve is inserted therein. The sleeve has an annular flange at one end which has a greater outer diameter than the inner portion of the sleeve which is inserted into the outer tubular member. This flange abuts against the outer tubular member to secure it from inward movement. A longitudinal slot in the sleeve allows the sleeve to be compressed for insertion into the outer tubular member.

Thus, this sleeve can be compressed at its inner end, inserted into the end of the pole, with the locking stubs of the sleeve aligned with the locking apertures of the pole. As the locking stubs are inserted into the apertures, the sleeve is snapped into place and will be secured there as an inner tubular member is slid through the sleeve and prevents the locking stubs from becoming released.

One object of this invention is to provide an interior sleeve which can be easily mounted in an extension pole and accordingly reduces manufacturing and assembly costs. Another object of the invention is to provide a sleeve for tubular extension poles which will provide a tight fit for the poles and more control of the poles in use. The sleeve of this invention has a very smooth surface for slidability of the poles, yet remains secured in place during use and operates as a stop to a locking device mounted on the other end of the pole to prevent the poles from becoming detached from each other.

DESCRIPTION OF THE DRAWINGS

FIG. 1 is a perspective view of an extension pole utilizing the sleeve of this invention.

FIG. 2 is a perspective view of a prior art sleeve.

FIG. 3 is an exploded perspective view of the assembly of the interior sleeve of this invention within telescoping tubular poles.

FIG. 4 is a partial sectional view of the sleeve in an assembled pole, taken along line 4—4 of FIG. 1.

FIG. 5 is a cross-sectional view of the outer pole taken along line 5—5 of FIG. 3.

FIG. 6 is a cross-sectional view of the sleeve taken along line 6—6 in FIG. 3.

FIG. 7 is a cross-sectional view of the tubular pole assembly taken along line 7—7 of FIG. 4.

DESCRIPTION OF THE PREFERRED EMBODIMENT

The present invention is an interior sleeve for telescoping tubular members 13, 15, 17, such as would be used in an extension pole 19, shown in FIG. 1 with a squeegee 21 attached to the distant end. The telescoping tubular members comprise an outer tubular member 13 and inner tubular member 15. Of course, a tubular member 15 is the inner tubular member of tubular section 13, but it is the outer tubular member relative to tubular member 17. An interior sleeve 11 is disposed between telescoping members 13, 15 and between members 15, 17 at their respective points of joinder. The interior sleeve has been illustrated herein for use with extension poles, although it may also be used with any outer tubular member through which an inner cylindrical body, which could be a similar tube or a solid rod or the like, is passed.

The outer tubular member 13 has at least one locking aperture 13a disposed in the wall 13b of the tubular member proximate its first end 13c. The other end 13d of the outer tubular member 13 may bear a grip for the user's hands (not shown). The other end 15d of tubular member 15 may be inserted into the first end 13c of outer tubular member 13. Similarly, the other end of any smaller tubular member may be inserted into the first end of the next larger tubular member. The outer tubular member preferably has opposed locking apertures 13a, 13a for additional securement of the interior sleeve. The locking apertures are disposed near the first end 13c of the outer tubular member at a distance selected to correspond with mating projections 27, 27 on the interior sleeve 11. In a typical extension pole, this distance may be an inch to several inches from the end 13e; it should be a sufficient distance that the locking studs will provide stability and a secure fit of the sleeve in the tubular member.

The interior of the interior sleeve 11 is hollow and when it is inserted into the first end 13c of outer tubular member 13 it provides a hollow passage which permits a cylindrical member, such as an inner tubular member 15, to slidably move through said sleeve. The inner diameter of the interior sleeve is generally uniform, and it is sufficiently greater than the outer diameter of the inner tubular member 15, that it allows a smooth sliding movement of the inner tube.

The interior sleeve 11 has an inner portion or shank 23 which is inserted into the outer tubular member 13 at its first end 13c. The sleeve also has an annular flange 25 disposed at the outer end of the sleeve to abut the first end 13e of the outer tubular member. The inner portion 23 of the sleeve extends inwardly from the first end 13c of the tubular member and has at least one locking stub 27 disposed on its exterior surface. In the preferred embodiment, the interior sleeve has a pair of opposed locking stubs 27, 27 which are adapted to fit into the locking apertures 13a, 13a of the outer tubular member 13. The locking stubs are short projections disposed on the inner portion of the interior sleeve at a distance inwardly from the annular flange 25 which corresponds to the distance of the locking apertures 13a, 13a, located in the walls of the outer tubular member from the first end of the outer tubular member. The height of the locking stubs is approximately equal to the thickness of wall 13b and the outer surface of the locking stubs generally conforms to the shape of the outer wall of the tubular member so that when the locking stubs are anchored in the locking apertures, their exterior surface is flush, or coextensive, with the exterior surface of the outer tubular member.

The annular flange 25 of the interior sleeve 11 is disposed at the outer end of the sleeve to abut to the first end 13c of the outer tubular member when said sleeve is inserted therein and to secure said sleeve from further inward movement in the outer tubular member. This flange is preferably an annular collar with an outer diameter greater than the inner diameter of said outer tubular member 13 and greater than the outer diameter of the inner portion 23 of the sleeve. At the point that the collar is joined to the shank, an annular shelf or ridge 25a is formed which creates an abutment against the outer end 13e of the outer tubular member 13 and secures the sleeve in place. The thickness of this shelf or ridge 25a is approximately equal to the thickness of the wall 13b so that the exterior surface of the annular collar is coextensive with the exterior surface of the outer tubular member when the sleeve has been inserted therein. The exterior surface of the flange, as well as that of the locking stubs, thus do not create any obstructions to the user's hands as the extension pole is pulled through his or her hands.

The interior sleeve 11 also has a longitudinal slot 29 along its shank 23 to allow compression of the inner portion of the sleeve. Preferably, the longitudinal slot will extend from the inner end 23a to the outer end 23b of the shank proximate the flange 25 and the slot will be wider at the inner end 23a than at its outer end 23b. In fact, in the preferred embodiment the horizontal slot is V-shaped. The slot will allow the sleeve to be compressed sufficiently to be inserted into the outer tubular member. It can then be forced into the tube until the flange 25 stops further inward movement. The locking studs 27, 27 are disposed close to the outer end of the shank a predetermined distance to correspond to the location of the locking apertures 13a, 13a. When aligned in the tubular member, the locking stubs spring into the apertures and the sleeve is then locked in place inside the outer tubular member.

The outer tubular member, which is typically made of metal, may additionally be formed with a longitudinal ridge 31 disposed on its interior surface. The locking apertures 13a, 13a preferably are stamped into the tube 90° from such ridge to facilitate the alignment of the horizontal slot of the interior sleeve in the tubular member. Locking stubs 27, 27 will then be immediately aligned with the locking apertures and will snap in place.

The interior sleeve is preferably molded from a durable material such as an Acetal plastic, which has a smooth, slippery surface for ease of slidability. Delrin ® brand plastic has been used successfully for the invention.

The poles may be assembled so that an interior locking device is mounted in the other end of a tubular member, such as end 15d, and inserted into pole 13 after sleeve 11 has been attached to the first end 13c. The locking mechanism may comprise a driver 33 which has exterior threads 37 and a restraining knob 39 at the end thereof. A slotted expanding sleeve 41 with exterior longitudinal grooves is mounted on the driver and held in place by the restraining knob. A slot 43 in the expandable sleeve is aligned with ridge 31 in the outer tubular member when the inner pole with the locking mechanism is assembled. This locks the expanding sleeve of the locking device in place so that when the inner tubular member is rotated, this sleeve will be expanded against the interior of the outer tubular member 13. The interior sleeve 11, which is locked in the other end by the tubular member inserted through it, also operates as a stop for the interior locking mechanism herein described when the inner pole is pulled out from its nesting position because the outer diameter of the expanding sleeve is too large to pass through the interior sleeve.

Regardless of the locking means used with the extension poles, the interior sleeve 11 may be advantageously used in such telescoping poles. The combination of locking studs 27, 27 with the compressible horizontal slot 29 makes it possible to insert the sleeve easily into a tubular member that has corresponding locking apertures 13a, 13a. It may be inserted for the full length of its shank 23 and the annular flange 25 will abut the outer end 13e of the tubular pole causing it to be stopped and aligned with the locking apertures. The interior sleeve of this invention thus snaps into place as one unit without adhesives, drying time or any extraordinary or time consuming assembly steps. Indeed, it has been found that the step of attaching the sleeve to the pole takes only a few seconds to achieve a permanent attachment compared to ten minutes or so required to insert the glued prior art sleeve and wait for it to dry, and then its attachment was not permanent. This sleeve is sturdy and permanently attached to the pole, regardless of the moisture or solvents which may penetrate the joint. This interior sleeve may also be a permanent stop means for a locking mechanism disposed in the inner tube and having a component with a larger diameter than the inner tube to prevent the inner tube from being completely pulled through the outer tube. The interior sleeve is designed to be flush on its exterior with the surface of the pole so that there are no obstructions for the user when pulling the exterior pole through his or her hands. The interior sleeve thus is maintained in a position where it holds two poles in tight alignment with each other, regardless of minor variations in manufacture of the poles and protects them from the wear otherwise caused by a loose fit of two interconnected poles. This sleeve also allows the pole to be used with control and precision.

Thus it can be seen that the present invention will achieve many advantages and objects attributed to it. While the invention has been described in detail, it is not to be limited to such details except as may be necessitated by the appended claims.

I claim:

1. An interior sleeve for an outer tubular member wherein a movable inner cylindrical member may be disposed, said outer tubular member comprising at least one locking aperture disposed in the wall thereof proximate a first end of said outer tubular member,
   said interior sleeve providing a hollow passage to permit a cylindrical member to slidably move through said sleeve, said interior sleeve comprising an annular flange disposed at the outer end of said sleeve to abut to the first end of said outer tubular member when said sleeve is inserted therein and to secure said sleeve from further inward movement in said outer tubular member;
   an inner portion of said interior sleeve extending inwardly from said first end of the outer tubular member and having at least one locking stub disposed on the exterior surface of said inner portion, said locking stub adapted to fit into the locking aperture of said outer tubular member; and
   a longitudinal slot to allow compression of said inner portion of said interior sleeve.

2. The interior sleeve of claim 1 wherein the outer tubular member comprises opposed locking apertures and said interior sleeve comprises corresponding locking stubs in opposed relation.

3. The interior sleeve of claim 1 wherein the flange is an annular collar with an outer diameter greater than the inner diameter of said outer tubular member.

4. The interior sleeve of claim 2 wherein the longitudinal slot is wider at the inner end of the interior sleeve than at its outer end.

5. The interior sleeve of claim 2 wherein the opposed locking stubs are disposed on the inner end of the interior sleeve a predetermined distance from the annular flange.

6. An interior sleeve for a pair of telescoping tubular members, the outer tubular member comprising a first end for passage of an inner tubular member therethrough and opposed locking apertures disposed in the wall of said outer tubular member proximate said first end; the interior sleeve being disposed proximate said first end of the outer tubular member, said interior sleeve having an inner diameter greater than the outer diameter of the inner tubular member and providing a passage for said inner tubular member through said interior sleeve, said interior sleeve further comprising
   an inner portion extending inwardly from the first end of the outer tubular member and opposed locking stubs disposed on the exterior surface of said inner portion, said locking stubs adapted to fit into the locking apertures of said outer tubular member;
   a longitudinal slot having a width sufficient to allow compression of the inner portion of said interior sleeve; and
   an annular collar disposed at the outer end of the interior sleeve and having an outer diameter greater than the outer diameter of the inner portion of the interior sleeve, said annular collar forming an abutment against the first end of the outer tubular member to secure said sleeve from further inward movement into said outer tubular member.

7. The interior sleeve of claim 6 wherein the exterior surface of the annular collar is coextensive with the exterior surface of the outer tubular member when said sleeve is disposed in the end thereof.

8. The interior sleeve of claim 7 wherein the surface of said locking stubs when disposed in said locking apertures is coextensive with the exterior surface of the outer tubular member.

9. The interior sleeve of claim 6 wherein the outer tubular member further comprises a longitudinal ridge disposed on its interior surface for the alignment of the slot of the interior sleeve.

10. The interior sleeve of claim 6 wherein the longitudinal slot is V-shaped with a wider opening at the inner end of the interior sleeve.

* * * * *